(12) United States Patent
Bellows et al.

(10) Patent No.: US 12,308,650 B2
(45) Date of Patent: May 20, 2025

(54) ENERGY STORAGE UNIT DOCKING STATIONS

(71) Applicant: NOMAD TRANSPORTABLE POWER SYSTEMS, INC., Waterbury, VT (US)

(72) Inventors: Jonathan Edward Bellows, Waterbury, VT (US); Gregg Richard Noble, Saxtons River, VT (US); Stephen P. Hoskins, Waterbury Center, VT (US); Margaret May Dobroth, Bolton, VT (US); Samuel Andrew Gavett, Waitsfield, VT (US); Alex David Perkins, North Ferrisburgh, VT (US)

(73) Assignee: NOMAD TRANSPORTABLE POWER SYSTEMS, INC., Waterbury, VT (US)

( * ) Notice: Subject to any disclaimer, the term of this patent is extended or adjusted under 35 U.S.C. 154(b) by 50 days.

(21) Appl. No.: 18/546,745

(22) PCT Filed: Feb. 16, 2022

(86) PCT No.: PCT/US2022/016623
§ 371 (c)(1),
(2) Date: Aug. 16, 2023

(87) PCT Pub. No.: WO2022/178009
PCT Pub. Date: Aug. 25, 2022

(65) Prior Publication Data
US 2024/0313541 A1    Sep. 19, 2024

Related U.S. Application Data

(60) Provisional application No. 63/150,151, filed on Feb. 17, 2021.

(51) Int. Cl.
H02J 3/32 (2006.01)
H02J 7/00 (2006.01)

(52) U.S. Cl.
CPC .......... *H02J 3/322* (2020.01); *H02J 7/00036* (2020.01); *H02J 2207/20* (2020.01); *H02J 2310/48* (2020.01)

(58) Field of Classification Search
CPC .... H02J 3/322; H02J 7/00036; H02J 2207/20; H02J 2310/48
See application file for complete search history.

(56) References Cited

U.S. PATENT DOCUMENTS

| 6,165,004 A | 12/2000 | Robinson |
| 9,847,654 B2 | 12/2017 | Beaston |

(Continued)

FOREIGN PATENT DOCUMENTS

| CH | 716062 | 10/2020 |
| CN | 202564785 | 11/2012 |

(Continued)

OTHER PUBLICATIONS

PCT International Application No. PCT/US22/16623, International Search Report and Written Opinion of the International Searching Authority, dated May 19, 2022, 7 pages.

(Continued)

*Primary Examiner* — Jared Fureman
*Assistant Examiner* — Duc M Pham
(74) *Attorney, Agent, or Firm* — DLA PIPER LLP (US)

(57) ABSTRACT

An example of an apparatus to connect a power distribution network with a mobile utility-scale energy storage unit is provided. The apparatus includes an enclosure to protect an interior space from weather elements. The apparatus further includes an interface device disposed within the enclosure. In addition, the apparatus includes a bellows extending from (Continued)

the enclosure and bellows connector to mate with a complimentary connector on a wall of an energy storage unit to form a weatherproof seal. The apparatus also includes a cable extending from the interface device through the bellows to connect the interface device to the energy storage unit to transfer energy between the power distribution network and the energy storage unit.

20 Claims, 8 Drawing Sheets

(56) References Cited

U.S. PATENT DOCUMENTS

| | | |
|---|---|---|
| 2016/0185244 A1 | 6/2016 | Baxter et al. |
| 2017/0141510 A1 | 5/2017 | Lacey |
| 2017/0346322 A1 | 11/2017 | Kuran et al. |
| 2020/0160461 A1 | 5/2020 | Kaniki |
| 2023/0335995 A1* | 10/2023 | Brooker .......... H02J 3/322 |
| 2024/0128761 A1* | 4/2024 | Bellows .......... H02J 3/322 |

FOREIGN PATENT DOCUMENTS

| | | |
|---|---|---|
| CN | 205104946 | 3/2016 |
| CN | 107634464 | 1/2018 |
| CN | 210852185 | 6/2020 |
| DE | 102011006104 | 3/2012 |
| RU | 194769 | 12/2019 |
| RU | 200680 | 11/2020 |
| WO | 2019/064188 | 4/2019 |

OTHER PUBLICATIONS

PCT International Application No. PCT/US22/16624, International Search Report and Written Opinion of the International Searching Authority, dated Jun. 2, 2022, 7 pages.

PCT International Application No. PCT/US22/16618, International Search Report and Written Opinion of the International Searching Authority, dated May 19, 2022, 7 pages.

Power Edison, "Mobile Energy Storage," https://www.poweredison.com/solutions, printed Jan. 17, 2021, 4 pages.

Res, "Mobile Energy Storage," RES Group, printed Dec. 5, 2023, 2 pages.

* cited by examiner

ENERGY STORAGE UNIT DOCKING STATIONS

CROSS-REFERENCE TO RELATED APPLICATION

This application is the National Stage filing under 35 U.S.C. 371 of International Application No. PCT/US2022/016623, filed Feb. 16, 2022, which claims priority to and the benefit of U.S. Provisional Patent Application No. 63/150,151, filed Feb. 17, 2021, which are incorporated by reference in their entireties.

BACKGROUND

Electricity and the delivery of electricity is an important part in industrial development, economic development, and for personal use in daily life. Electricity may be generated to supply a power system or power grid. The demand of the power grid may fluctuate through time, in short intervals such as throughout the day, or over longer periods of time such as seasons of the year. For example, air conditioning energy loads may increase the amount of demand for electricity for the grid during the summer months, while this demand may vanish in the winter months. When the demand for electricity increases, the supply of electricity may not be able to be increased beyond an infrastructure limit. Accordingly, energy sources, such as generating stations are typically designed to provide the peak electricity demanded. When the demand exceeds this amount, the power system may not be able to maintain the specified power requirements of the loads resulting in brownouts, blackouts, or increases in power costs as the supplier adjusts and purchases electricity from the active, open market.

Energy storage systems may be used at the utility-scale to balance electricity supply and demand. In particular, lithium-ion batteries provide a high energy efficiency, long cycle life, and high energy density storage platform. Due to the weight and safety issues associated with moving charged utility-scale lithium-ion batteries, they are generally shipped in an uncharged and non-racked state to a location to be installed and charged for use. Accordingly, these utility-scale energy storage systems are generally at a fixed location and involve significant assembly and disassembly processes when the batteries are moved from one location to another. In practice, this generally means that lithium-ion batteries are only deployable at a specific location connected to one point on an electric grid where they remain for an extended period of time, for example, for 10-20 years.

SUMMARY

In accordance with an aspect of the invention, an apparatus is provided. The apparatus includes an enclosure to protect an interior space from weather elements. The apparatus further includes an interface device disposed within the enclosure. The interface device is connected to a power distribution network. In addition, the apparatus includes a bellows extending from the enclosure. The bellows is connected to the enclosure at a first end. Furthermore, the apparatus includes a bellows connector disposed on a second end of the bellows. The second end is opposite the first end. The bellows connector is to mate with a complimentary connector on a wall of an energy storage unit to form a weatherproof seal. The apparatus also includes a cable extending from the interface device through the bellows to connect the interface device to the energy storage unit to transfer electricity between the power distribution network and the energy storage unit.

The apparatus may further include an extendible arm within the bellows to provide structural rigidity. The extendible arm may be remotely controlled.

The apparatus may additionally include a transformer disposed between the interface device and the power distribution network. The transformer may be to adjust a voltage provided to the power distribution network by the energy storage unit. The apparatus may also include a concrete slab to support the interface device.

The apparatus may include a parking guidance system. The parking guidance system may include a status light. The parking guidance system may include a stop cushion to engage a portion of a transporter carrying the energy storage unit.

Furthermore, the apparatus may include a lock to secure the transporter in place.

In accordance with another aspect of the invention, an apparatus is provided. The apparatus includes an enclosure to protect an interior space from weather elements. The apparatus further includes an interface device disposed within the enclosure. The interface device connected to a power distribution network. Furthermore, the apparatus includes an extendible arm extending from the enclosure. The extendible arm is connected to the enclosure at a first end. The extendible arm is rigid. The apparatus also includes a connector disposed on a second end of the extendible arm. The second end is opposite the first end, and wherein the connector is to mate with an energy storage unit to form a weatherproof seal. In addition, the apparatus includes a cable extending from the interface device through the extendible arm to connect the interface device to the energy storage unit to transfer energy between the power distribution network and the energy storage unit.

In accordance with another aspect of the invention, a method is provided. The method involves positioning an energy storage unit to a location proximate to an interface device. The interface device is to connect to a power distribution network. Furthermore, the method involves connecting a cable from the interface device to the energy storage unit to transfer energy between the power distribution network and the energy storage unit. The method also involves mating a bellows extending from the interface device to an exterior wall of an energy storage unit to form a weatherproof seal between the interface device and the energy storage unit to protect the cable.

BRIEF DESCRIPTION OF THE DRAWINGS

Reference will now be made, by way of example only, to the accompanying drawings in which.

DETAILED DESCRIPTION

Figure 1A:
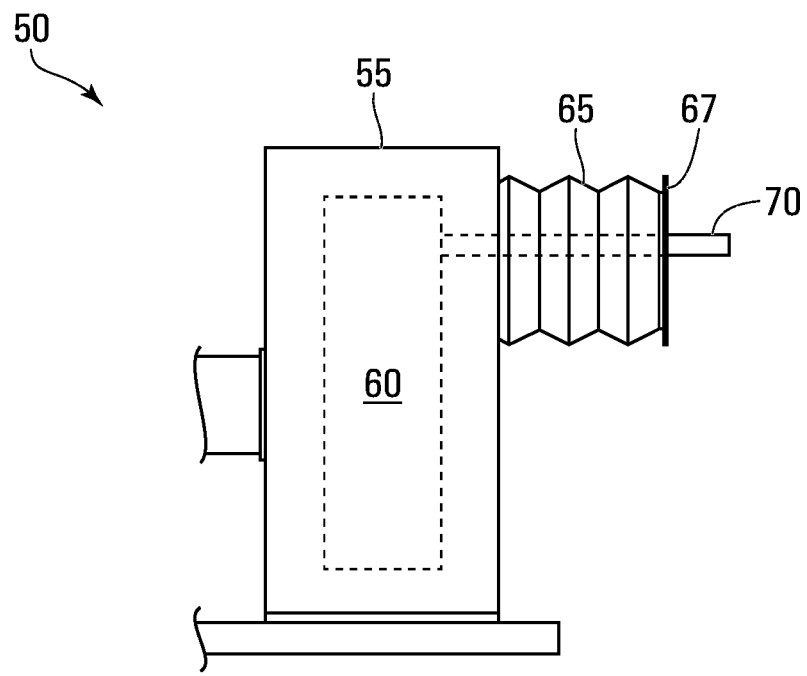
FIG. 1A is a side view representation of an example of an apparatus to connect a power distribution network with a mobile utility-scale energy storage unit at a location.

The demand for electricity may often fluctuate to create imbalances between power generation and power consumption. In particular, instantaneous demand for electrical energy is often unpredictable from day to day and may depend on various factors such as temperature, industrial manufacturing changes, and seasonal variations. Since electricity storage is generally not used, the variations may result in challenges to the power distribution network in terms of electricity generation and distribution. To address this issue, a utility-scale energy storage system may be installed in the power distribution network, such as a power grid, to convert and store electricity from an energy source, such as a generator, and to subsequently convert it back into electrical energy to be re-supplied into the power distribution network. In some examples, additional electrical energy above the generation rate of power distribution network may be provided during peak demand periods. During these periods, an energy storage system that has been pre-charged with power may supplement the electricity supplied in the power distribution network.

Although batteries are now commonly used to provide portable electrical energy on a small scale such as to power electric cars and other apparatus, such as portable equipment at a remote work site, utility-scale energy storage systems, such as systems with a capacity greater than about 200 kilowatt-hours are typically stationary by design. In particular, utility-scale energy storage systems cannot be transported safely while in a charged or operational state due to the large amount of energy stored, the weight of the batteries, and the inertial forces which act upon them during transit. An accident during transportation may result in a catastrophic event. Accordingly, the batteries for utility-scale energy storage solutions are generally transported in a safer non-operational state, or de-racked state. Therefore, the energy storage system is to be installed or racked up at the final location to be installed in a fixed facility. Prior to moving the batteries of a utility-scale energy storage system, the batteries are to be de-racked and converted into a non-operational state for safe transportation.

Portable energy storage systems generally involve moving mobile energy storage units from one location to another. At each location, a mobile energy storage unit is to be connected to a power distribution network for grid-connected solutions or directly to a circuit supporting the electric load for off-grid connected solutions. The connection generally involves manually connecting a cable directly to the mobile energy storage unit. The cable may be connected directly to the power distribution network in some systems where the mobile energy storage unit generates power output in a form directly usable by the power distribution network. In other systems, the cable may be connected to an interface to convert the power output of the mobile energy storage unit into a form useable by the power distribution network. As an example, a mobile energy storage unit may typically include battery cells which provide DC current to be converted to AC current prior to transmission across most power distribution networks.

An apparatus is provided to connect to a mobile utility-scale energy storage unit to transfer energy from the mobile utility-scale energy storage unit to the power distribution network. The apparatus is to be installed at a connection point for a power distribution network, or off-grid facility requiring additional power, to allow for connecting to and disconnecting from a mobile energy storage unit quickly and safely. In particular, the apparatus may include a standardized connector to allow for quick connections with multiple energy storage units of varying energy capacities and power output levels. Furthermore, the apparatus includes a housing and a weatherproof connection between the power distribution network and the mobile energy storage unit to reduce wear of the connection. In addition, the apparatus increases safety by adding another layer to protect users direct access to cabling runs which may cause an accident from electrical shock. After disconnecting from the apparatus, the energy storage unit may be moved from a location to another similar apparatus at another location in an operational state without having to prepare the energy storage unit for transportation. Accordingly, this allows for the quick addition of energy storage capacity at a power distribution network when demand increases and for the energy storage capacity to be reallocated to another location when demand decreases.

Referring to FIG. 1A, an apparatus to connect a power distribution network with a mobile utility-scale energy storage unit is generally shown at 50. The apparatus 50 may include additional components, such as various additional interfaces and/or input/output devices such as indicators to interact with a user of the apparatus 50. The interactions with the user may include viewing the operational status of the apparatus 50 or the system in which the apparatus 50 operates, such as the status of the mobile utility-scale energy storage unit or the status of the power distribution network. In the present example, the mobile utility-scale energy storage unit may be on a trailer that is positioned proximate to the apparatus 50 for connecting to the power distribution network. Accordingly, the apparatus 50 may also include additional sensors and controls to automate the docking, positioning, or connection process between the mobile utility-scale energy storage unit and the power distribution network. In the present example, the apparatus includes an enclosure 55, an interface device 60, a bellows 65 with a connector 67, and a cable 70.

The enclosure 55 is to provide an interior space that is protected from weather elements. The particulars of the enclosure 55 are not particularly limited and may be varied depending on the geographic location to accommodate local weather conditions at the location where the apparatus 50 is placed. For example, the enclosure 55 is to be constructed with sufficient mechanical rigidity, such as steel, to withstand forces from weather elements such as wind bursts, rain, snow, dust, and ice that may be typical for the geographic location. In particular, the enclosure 55 may be configured to keep the interior dry so that moisture sensitive equipment, such as electronics, is protected from damage or subjected to excessive wear and tear. In some examples, the enclosure 55 may be constructed of from a nonconductive material to reduce the risk of electrical shock. Furthermore, the enclosure 55 may include features to protect the apparatus 50 from the elements, such as weather stripping, rust protections, etc. For example, the enclosure 55 may include insulation and/or a climate control system (not shown) to protect from temperature changes. Furthermore, the enclosure 55 may include a fire suppression unit such as a clean agent fire suppression system to improve safety during operation in the interface device 60 malfunctions or catches fire. Alternatively, a traditional fire suppression system, such as a dry deluge standpipe leading to a sprinkler system, and an interior shock absorption system mounted to the top, bottom, and sides of the enclosure 55.

In some examples, the enclosure 55 may include various peripheral devices. For example, an interface, such as a human-machine interface panel (not shown), may be mounted onto the enclosure 55. The interface may be used to provide on-site controls for a user. As another example, a communication device may also be mounted onto the enclosure to provide a communications channel with a remote device. In further examples, a meteorological sensor array and recording device may also be mounted onto the enclosure 55.

The interface device 60 is disposed within the enclosure 55. The interface device 60 is to connect to the mobile utility-scale energy storage unit and the power distribution network to provide the transfer of electricity from the mobile utility-scale energy storage unit to the power distribution network. In some examples, the interface device 60 may also be used to transfer surplus electricity from the power distribution network to the mobile utility-scale energy storage unit to recharge the mobile utility-scale energy storage unit during periods of lower demand.

In the present example, the mobile utility-scale energy storage units that connect to the interface device 60 provide current at 480 VAC 3 Phase. Accordingly, the interface device 60 may be directly connected to the power distribution network and the interface device 60 may be a cable stored in the enclosure 55 to be protected from the weather elements. In other examples, the interface device 60 may include electronics to control the flow of electricity. Furthermore, in examples where the utility-scale energy storage unit provides DC power, the interface device 60 may include further electronics to provide compatible power to the power distribution network, such as an inverter to convert the DC power to AC power.

In some examples, the interface device 60 may have an additional DC-input for a solar array. In some examples, the interface device 60 may have an additional AC-input for a conventional gas, diesel, natural gas generator, or wind turbine. The additional power inputs of the interface device 60 may provide a centralized point of interconnection for both the mobile storage unit and onsite electricity generation to charge the mobile energy storage unit.

The bellows 65 is connected to the enclosure 55 and is to extend from the enclosure 55 to reach the mobile utility-scale energy storage unit. The bellows 65 includes a connector 67 disposed at the opposite end away from the enclosure 55. The connector 67 is to mate with a complimentary connector on the wall of the mobile utility-scale energy storage unit. Accordingly, when the bellows 65 is engaged with the mobile utility-scale energy storage unit, a weatherproof seal is formed between the enclosure 55 and the mobile utility-scale energy storage unit. It is to be appreciated by a person of skill with the benefit of this description that there are several advantages to providing a space protected from the weather elements. For example, since the space is protected from the elements such as moisture and wind, standard electrical components may be used instead of specialized weatherproof components.

Figure 1B:
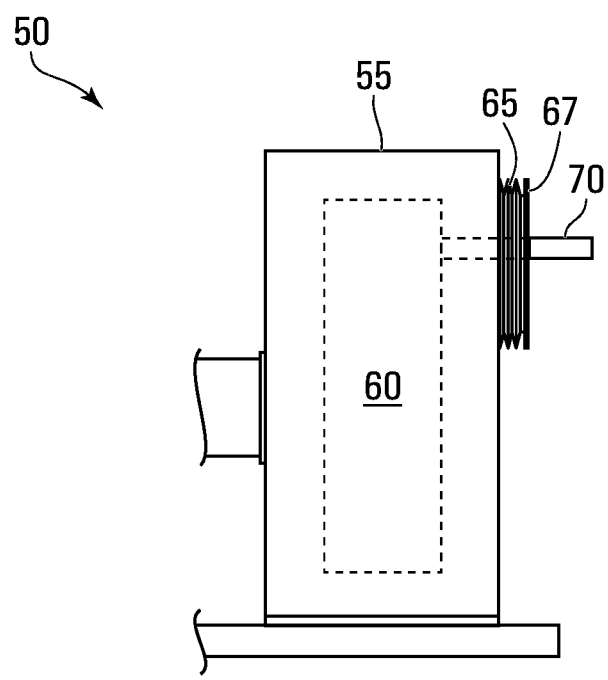
FIG. 1B is a side view representation of the apparatus shown in FIG. 1A with the bellows in a retracted position.
Figure 2:
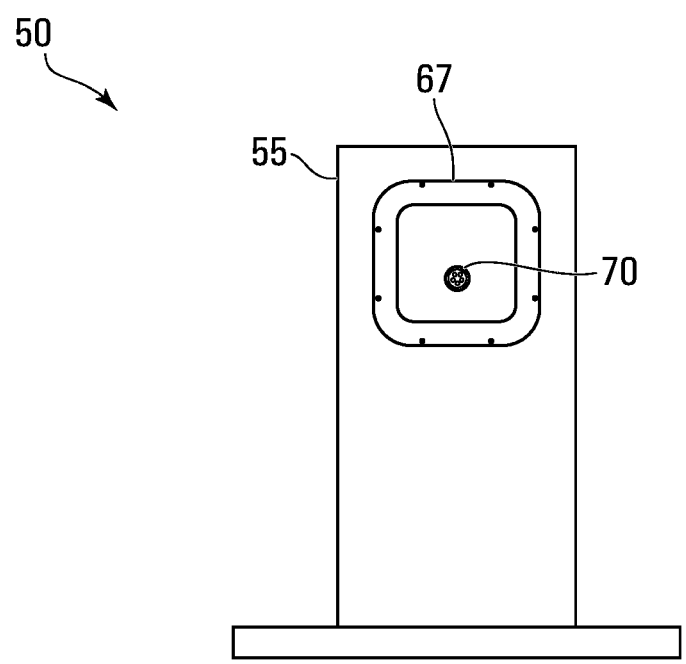
FIG. 2 is front view representation of the apparatus shown in FIG. 1A.

In the present example, the bellows 65 may be in an extended position as shown in FIG. 1A to mate the connector 67 with the complimentary connector on the wall of the mobile utility-scale energy storage unit. When the apparatus 50 is not in use, the bellows 65 may also be retracted as shown in FIG. 1B for storage. Referring to FIG. 2, the apparatus 50 from is shown from the front. It is to be appreciated by a person of skill with the benefit of this description that the bellows 65 and the bellows connector 67 are not particularly limited. In the present example, the connector 67 and the bellows 65 have a substantially square shape and provides substantial space for the cable 70 to pass therethrough. The connector 67 is not limited and may connect to the wall of the mobile utility-scale energy storage unit using a variety of mechanisms, such as the use of fasteners, clips, clamps, springs, vacuum seals, magnetic locking system, or a threaded connection. In addition, the connector 67 may include further features such as a safety interlock to prevent operation without connecting the connector 67 to the wall of the mobile energy storage unit. Furthermore, the shape of the bellows 65 and the connector 67 may be varied and be circular, or any other shape.

The cable 70 extends from the interface device 60 through the bellows 65 to the mobile utility-scale energy storage unit to form an electrical connection to the power distribution network. Accordingly, energy may be transferred from the mobile energy storage unit to the power distribution network or from the power distribution network to the mobile energy storage unit via the apparatus. It is to be appreciated by a person skilled in the art, that the cable 70 is not particularly limited and may be part of a plurality of cables connecting the interface device 60 to the mobile utility-scale energy storage unit. As mentioned above, in some examples, the interface device 60 may be combined with the cable 70 if there are no intervening electronics used to connect the energy storage unit to the power distribution network. As mentioned previously, the bellows 65 provides a protected environment by forming the weatherproof seal to the mobile energy storage unit through which the cable 70 may pass. Accordingly, the cable 70 and the connectors of the cable 70 are protected from excessive wear caused by elements. In addition, by enclosing the cable 70 and all connections, an extra layer of protection is provided for safety from accidental contact with the live wires as well as a security barrier to reduce tampering and sabotage.

Figure 3A:
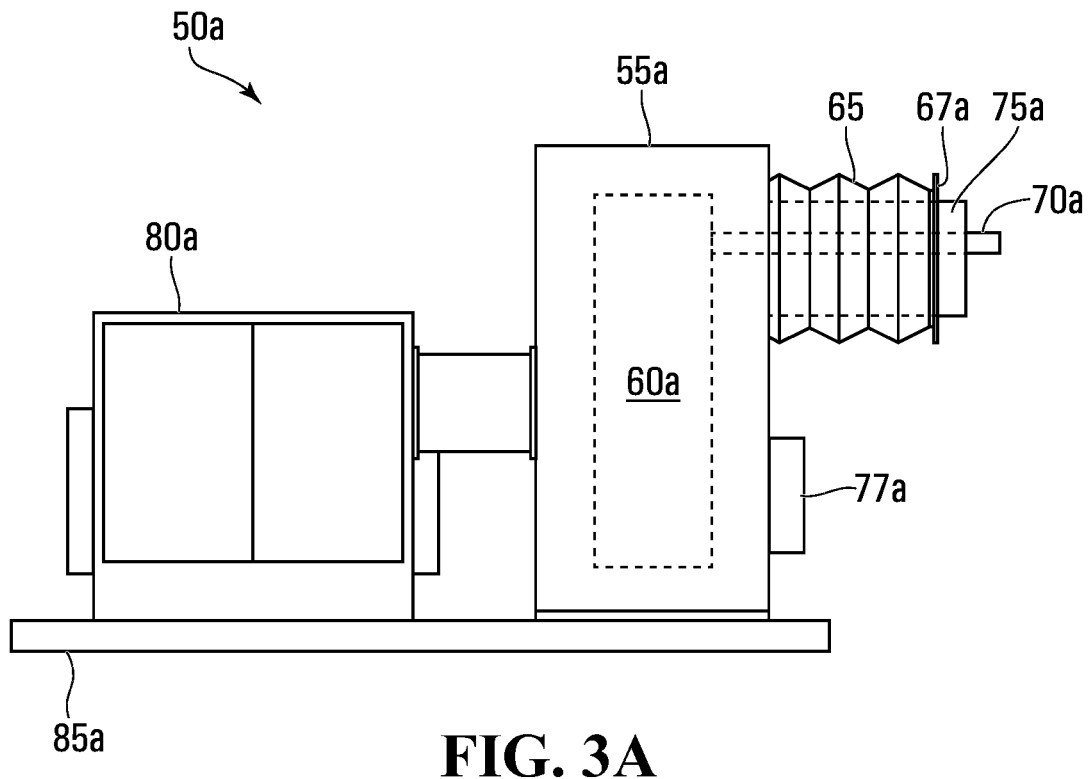
FIG. 3A is a side view representation of another example of an apparatus to connect a power distribution network with a mobile utility-scale energy storage unit at a location.
Figure 3B:
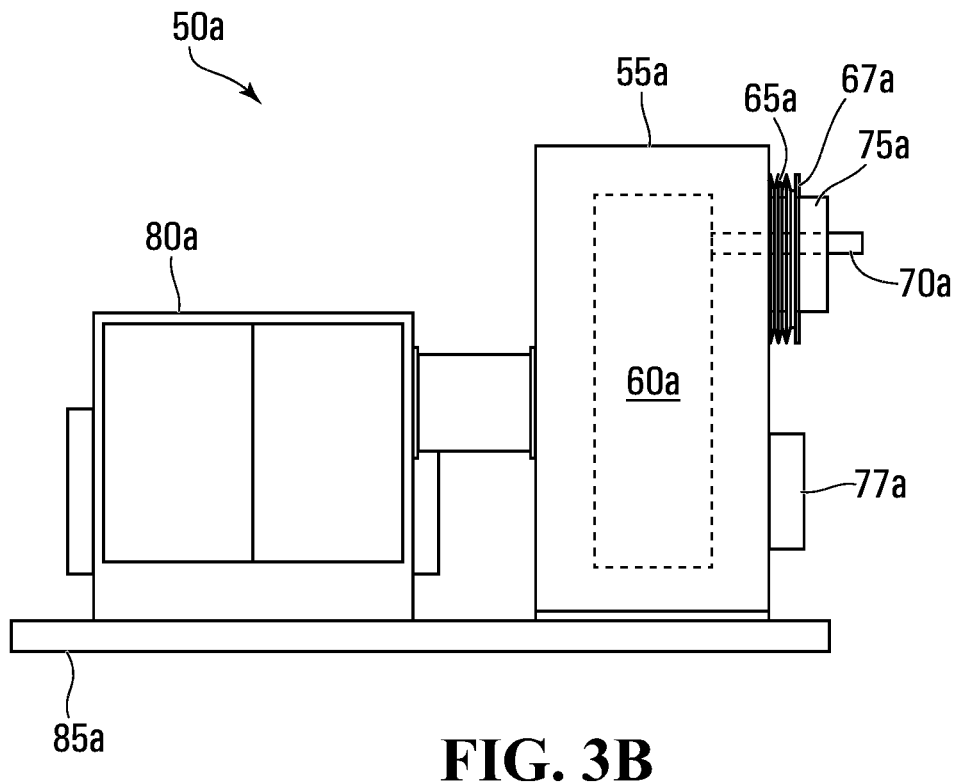
FIG. 3B is a side view representation of the apparatus shown in FIG. 3A with the bellows and extendible arm in a retracted position.

Referring to FIGS. 3A and 3B, another example of an apparatus 50a to connect a power distribution network with a mobile utility-scale energy storage unit is generally shown. Like components of the apparatus 50a bear like reference to their counterparts in the apparatus 50, except followed by the suffix "a". It is to be appreciated by a person of skill with the benefit of this description that apparatus 50a is not limited and may include additional components, such as those discussed above in connection with the apparatus 50. In the present example, the mobile utility-scale energy storage unit may be on a trailer that is positioned proximate to the apparatus 50a for connecting to the power distribution network. Accordingly, the apparatus 50a may also include additional sensors and controls to automate the docking, positioning, or connection process between the mobile utility-scale energy storage unit and the power distribution network. In the present example, the apparatus 50a includes an enclosure 55a, an interface device 60a, a bellows 65a with a connector 67a, a cable 70a, an extendible arm 75a, a transformer 80a and a foundation 85a.

In the present example, the apparatus 50a includes additional components to improve the docking process of the mobile utility-scale energy storage unit with the power distribution network. For example, the apparatus 50a may include an additional extendible arm 75a disposed within the bellows 65a to provide additional mechanical strength and structural rigidity to the interconnection between the enclosure 55a and the mobile utility-scale energy storage unit as well as to support the cable 70a. The extendible arm 75a may be connected to the connector 67a to be extended (as shown in FIG. 3A) and retracted (as shown in FIG. 3B) to position the connector 67a to the complementary connector disposed on the mobile utility-scale energy storage unit or into a storage position (as shown in FIG. 3B). The manner by which the extendible arm 75a is manipulated is not particularly limited. For example, the extendible arm 75a may be controlled manually by a user moving the connector 67a to the mobile utility-scale energy storage unit. Alternatively, the extendible arm 75a may include motors that may be controlled form a nearby panel, such as the controller 77a.

In other examples, the controller 77a may include a communications interface to receive commands from a remote user such that the extendible arm 75a may be remotely controlled by the user. For example, the remote user may be a driver of a truck tractor delivering the mobile utility-scale energy storage unit. Accordingly, it is to be appreciated by a person of skill with the benefit of this description that the connector 67a may be manipulated remotely to engage to the wall of the mobile utility-scale energy storage unit without the driver leaving the cab of the tractor. In other examples, the extendible arm 75a may be automated to engage the connector 67a with the mobile utility-scale energy storage unit using sensors without any user intervention.

The mechanism by which the extendible arm 75a is manipulated is not particularly limited. In the present example, the extendible arm 75a is a hollow extendible tube within the bellows 65a. The extendible arm 75a may extend and retract via a telescoping motion. In other examples, the extendible arm 75a may be a rigid conduit that can be retracted within the enclosure 55a or extended out without a telescoping motion. In other examples, the extendible arm 75a may be a solid rod or a plurality of rods connected by joints. In this example, the cable 70a may be secured to the extendible arm 75a such that manipulation of the extendible arm 75a would move the cable 70a as well. In further examples, the extendible arm 75a may be an articulating robotic arm.

In the present example, the transformer 80a is to be disposed between the interface device 60a and the power distribution network. Continuing with the example above where the mobile utility-scale energy storage unit provides 480 VAC, the transformer 80a may be used to adjust the voltage (i.e. step up or step down) to the power distribution network. The voltage to be provided to the power distribution network is not particularly limited. For example, the transformer 80a may be configured to step up the voltage from 480 VAC to 13200 VAC for transmission across the power distribution network. In other examples, the transformer 80a may be configured to step up the voltage from 480 VAC to 34500 VAC for transmission across the power distribution network at a higher voltage. The transformer 80a may also be used to step down the voltage from 480 VAC to 110 VAC or 230 VAC for delivery to a consumer site such as an office building or a plurality of residential buildings. It is to be appreciated by a person of skill with the benefit of this description that the transformer 80a may be configured to accommodate additional voltages or multiple voltages depending on the specific application. Accordingly, the transformer 80a may be configured to accommodate the interconnection voltage of an electric grid or end-user service in the case of an off-grid solution. Although the above examples illustrate an input of 480 VAC from the mobile utility-scale energy storage system, other examples may have an input with a different voltage.

Furthermore, the apparatus 50a includes a foundation 85a to provide a stable base and to support the enclosure 55a and the interface device 60a in the enclosure as well as the transformer 80a. It is to be appreciated by a person of skill with the benefit of this description that the apparatus 50a may often be built at a remote geographic location without a power source, such as a power plant nearby. At the remote location, such as a mine or construction worksite, or other location, the ground may not be stable. Accordingly, the foundation 85a provides a stable base to protect the equipment from being damage by a shifting ground that may cause mechanical stress between various components. The foundation 85a is not particularly limited. In the present example, the foundation may be a concrete pad. In other examples, the foundation 85a may also be a conductive metal ground plate. In addition to providing a stable base, the foundation 85a may also be used to adjust the height of the bellows 65a above the ground to facilitate mating with the complimentary connector on the wall of the mobile utility-scale energy storage unit. Furthermore, in some examples, the foundation 85a may include a barrier, such as a wall or fence to control access to the apparatus 50a.

Figure 4A:
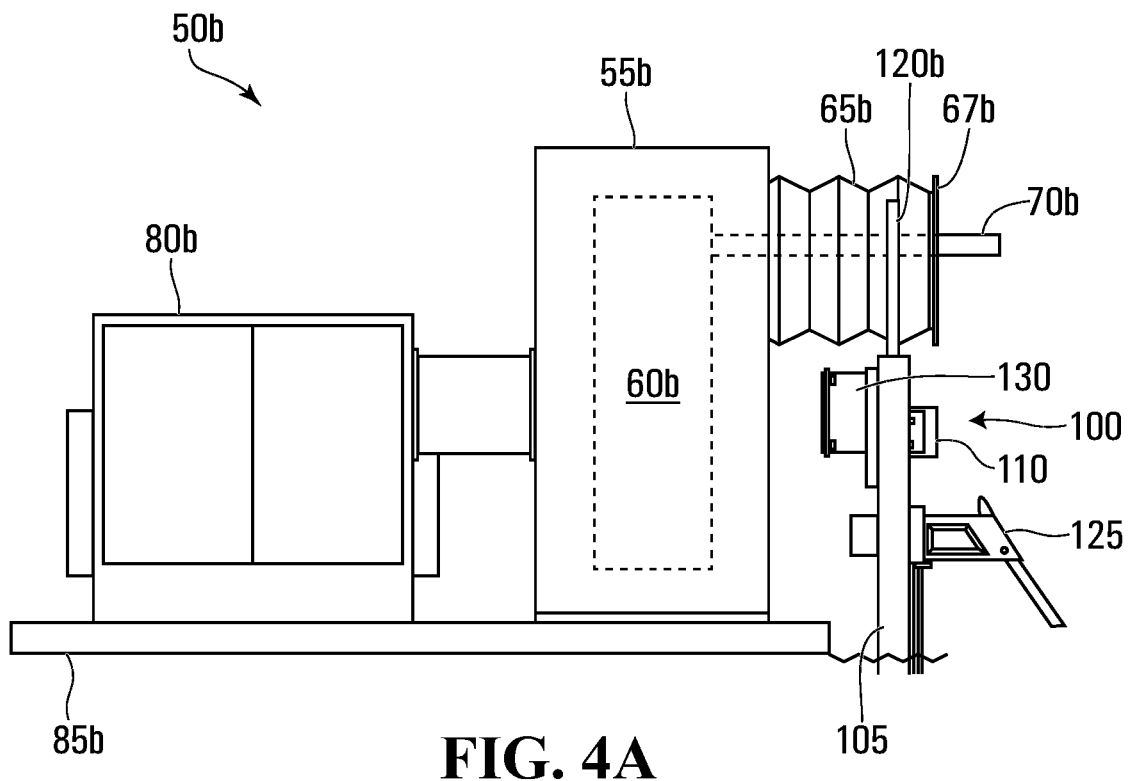
FIG. 4A is a side view representation of an apparatus with a parking guidance system to connect a power distribution network with a mobile utility-scale energy storage unit at a location.
Figure 4B:
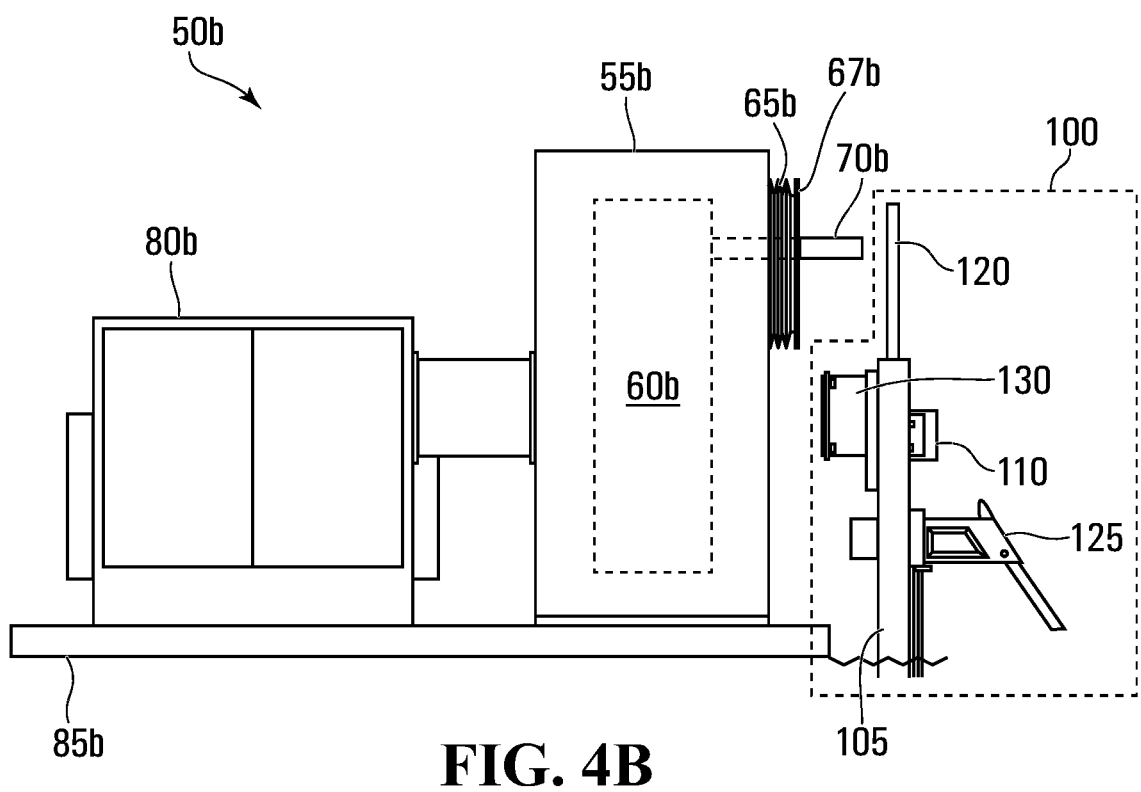
FIG. 4B is a side view representation of the apparatus shown in FIG. 4A with the bellows in a retracted position.

Referring to FIGS. 4A and 4B, another example of an apparatus 50b to connect a power distribution network with a mobile utility-scale energy storage unit is generally shown. Like components of the apparatus 50b bear like reference to their counterparts in the apparatus 50a, except followed by the suffix "b". It is to be appreciated by a person of skill with the benefit of this description that apparatus 50b is not limited and may include additional components, such as those discussed above in connection with the apparatus 50. In the present example, the mobile utility-scale energy storage unit may be on a trailer that is positioned proximate to the apparatus 50b for connecting to the power distribution network. Accordingly, the apparatus 50b may also include additional sensors and controls to automate the docking, positioning, or connection process between the mobile utility-scale energy storage unit and the power distribution network as discussed in greater detail below. In the present example, the apparatus includes an enclosure 55b, an interface device 60b, a bellows 65b with a connector 67b, a cable 70b, a transformer 80b, a foundation 85a, and a parking guidance system 100.

Figure 5:
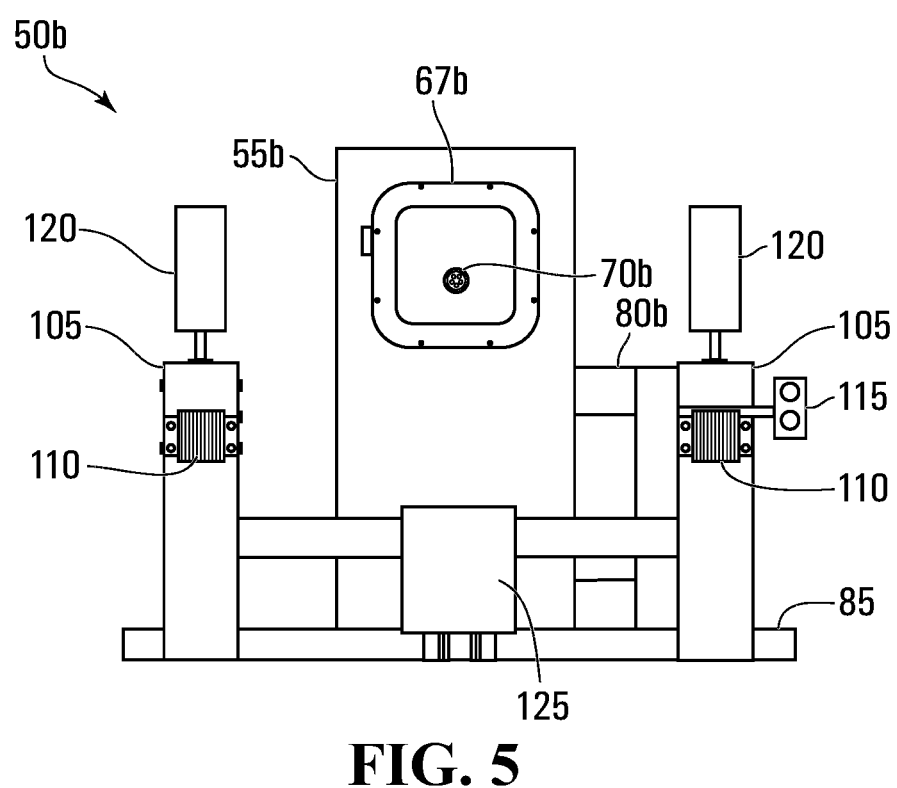
FIG. 5 is front view representation of the apparatus shown in FIG. 4A.

Referring to FIG. 5, the parking guidance system 100 is shown in greater detail from the front view. In the present example, the parking guidance system 100 is to assist a driver in delivering and connecting the mobile utility-scale energy storage unit to the apparatus 50b. The parking guidance system 100 is not particularly limited and may include additional components and omit some of the exemplary components discussed below. For example, the parking guidance system 100 may also include cameras and mirrors to assist the driver. In the present example, the parking guidance system 100 includes a support structure 105 with a stop cushion 110, indicator lights 115, indicators 120, a lock 125, and a controller 130.

The support structure 105 is not particularly limited and may be any structure mechanically strong enough to protect other components of the apparatus 50*b* such as the enclosure 55*b*. In particular, the driver of delivering the mobile utility-scale energy storage unit may back up a transporter, such as a trailer, carrying the mobile utility-scale energy storage unit to the apparatus 50*b*. The support structure 105 may be designed to withstand the forces of the transporter coming into contact with and engaging the stop cushion 110 in a low speed collision to protect the enclosure 55*b* from being damaged. In the present example, the support structure 105 may be a bar, a bollard, or I-beam driven sufficiently deep into the ground. In other examples, the support structure 105 may be a concrete extension of the foundation 85*b* or a bar or I-beam anchored in the foundation 85*b*.

The parking guidance system 100 may also include various indicators such as a status light 115. The status light 115 is not particularly limited and may serve multiple functions. For example, the status light 115 may be used to indicate the availability of the apparatus 50*b* to receive the mobile utility-scale energy storage unit. In other examples, the status light 115 may be uses to indicate the mobile utility-scale energy storage unit is in position. Further examples may include using the status light 115 to show the status of the energy storage unit connected to the apparatus 50*b*, such as whether the energy storage unit is charging, idling, discharging, or in a state of default. In addition, indicators 120, such as light guides, signs, or display screens, may be disposed on the support structure 105 to assist with the aligning of the mobile utility-scale energy storage unit during parking.

In further examples, the parking guidance system 100 may include a lock 125 to secure the transporter in place relative to the apparatus 50*b*. The lock 125 is not particularly limited and may be to secure the transporter of the mobile utility-scale energy storage unit to deter theft. In addition, it is to be appreciated by a person of skill that the lock 125 may also be used to provide a ground for the entire system.

Figure 6:
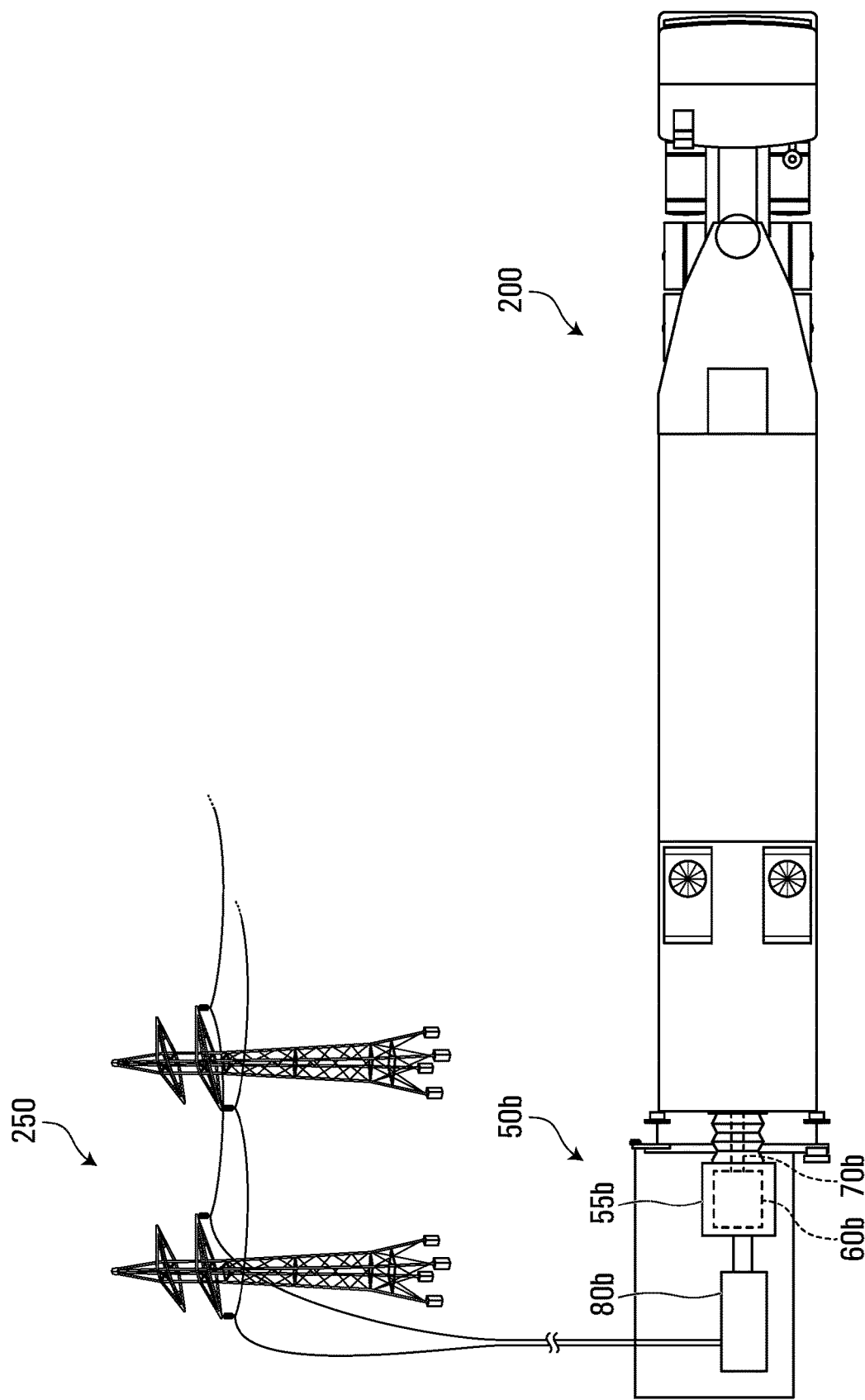
FIG. 6 is a schematic representation of the apparatus of FIG. 1 connected to a power distribution network and a mobile utility-scale energy storage unit.

Referring to FIG. 6, an example of a mobile utility-scale energy system is generally shown. In the present example, the apparatus 50*b* is to provide a connection mechanism for a mobile utility-scale energy storage unit 200 to a power distribution network 250. It is to be appreciated that the mobile utility-scale energy storage unit 200 and the power distribution network 250 are not limited and variations capable of performing the design functions may be substituted. As shown, the apparatus 50*b* may be installed proximate to the power distribution network 250 to allow for the mobile utility-scale energy storage unit 200 to be parked. The mobile utility-scale energy storage unit 200 may then supply excess power to the power distribution network 250 during peak demand times and to receive power from the power distribution network 250 during low demand times when the mobile utility-scale energy storage unit 200 may charge. In examples where the power distribution network 250 does not have any additional power sources, the mobile utility-scale energy storage unit 200 may be solely used to provide power to the power distribution network 250.

Figure 7:
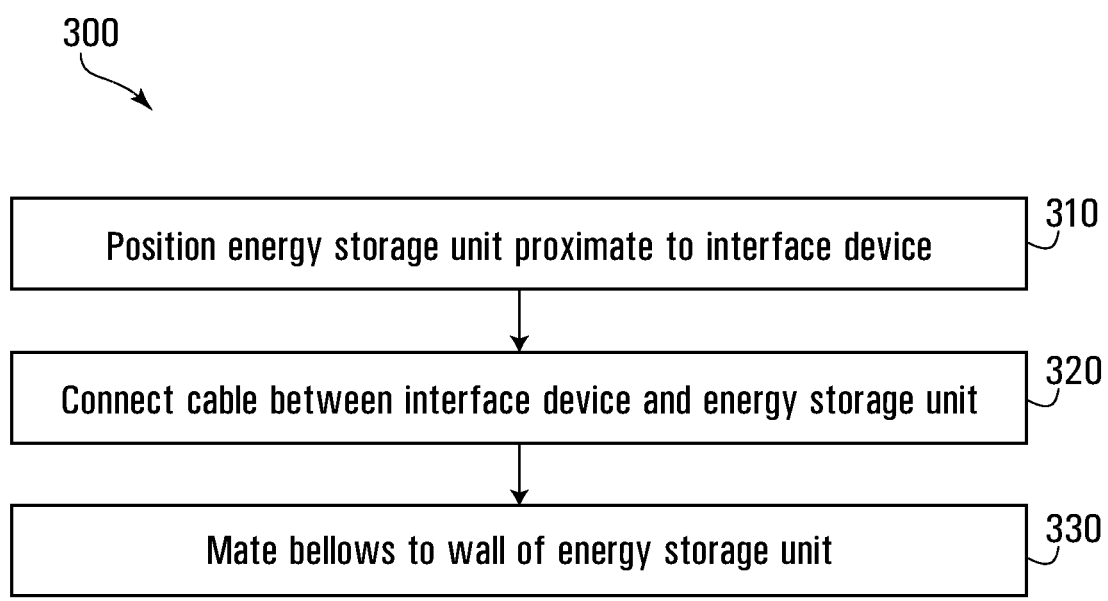
FIG. 7 is a flowchart of an example of a method of connecting a power distribution network with a mobile utility-scale energy storage unit at locations using the apparatus shown in FIG. 1.

Referring to FIG. 7, a flowchart of a method of connecting a power distribution network with a mobile utility-scale energy storage unit is generally shown at 300. In order to assist in the explanation of method 300, it will be assumed that method 300 may be performed by the apparatus 50, 50*a*, or 50*b*. For the purposes of this discussion of the method 300, it may be assumed that the method is to be carried out on the apparatus 50 unless otherwise stated. Indeed, the method 300 may be one way in which the apparatus 50 may be operated. Furthermore, the following discussion of method 300 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, an energy storage unit is to be position positioned proximate to the interface device 60. In the present example, the interface device 60 is connected to the power distribution network. The manner by which the interface device 60 is connected to the power distribution network is not particularly limited.

Block 320 involves connecting the cable 70 from the interface device 60 to energy storage unit. It is to be appreciated by a person of skill with the benefit of this description that connecting the interface device 60 to the energy storage unit provides a connection between the power distribution network and the energy storage unit to allow for transfer of energy therebetween. The present example, allows for two-directional power flow. This allows the energy storage unit to supply the power distribution network with additional energy during periods of high demand where the demand exceeds the power provided to the power distribution network from other power sources. Conversely, the energy storage unit may receive power from the power distribution network during periods of low demand on the power distribution network so that the energy storage unit may standby for the next period of high demand. Accordingly, it is to be appreciated that the energy storage unit may be install indefinitely at the location. In other examples where the power distribution network does not generate sufficient power to recharge the energy storage unit, the energy storage unit may be moved to another location for charging.

Next, the bellows 65 extending from the enclosure 55 of the interface device 60 is to be mated with a complimentary connector in an exterior wall of the energy storage unit. By connecting the bellows 56 to the exterior wall of the energy storage unit, a weatherproof seal is to be formed between the interface device 60 and the energy storage unit to protected the cable 70 extending through the bellows 65.

Figure 8A:
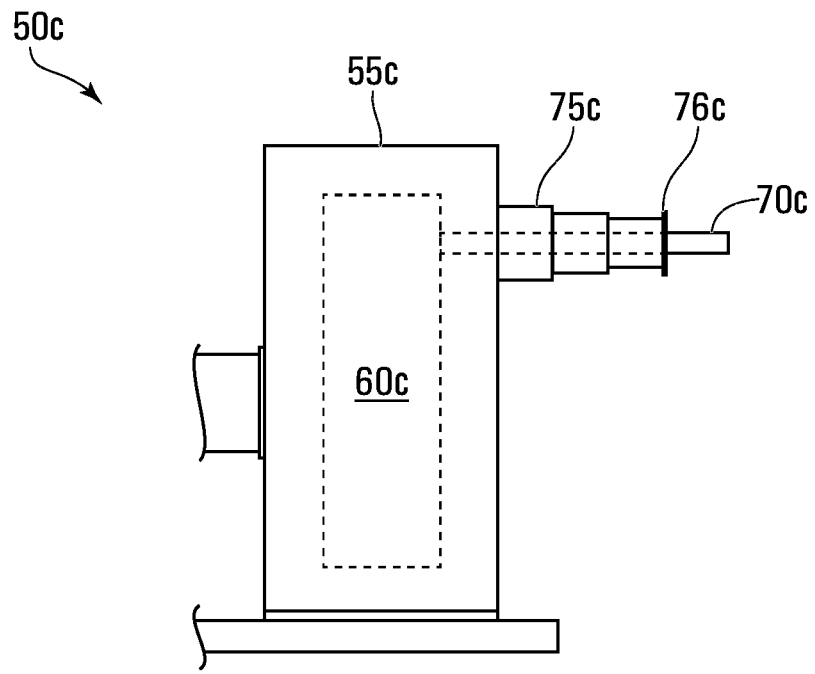
FIG. 8A is a side view representation of another example of an apparatus to connect a power distribution network with a mobile utility-scale energy storage unit at a location.
Figure 8B:
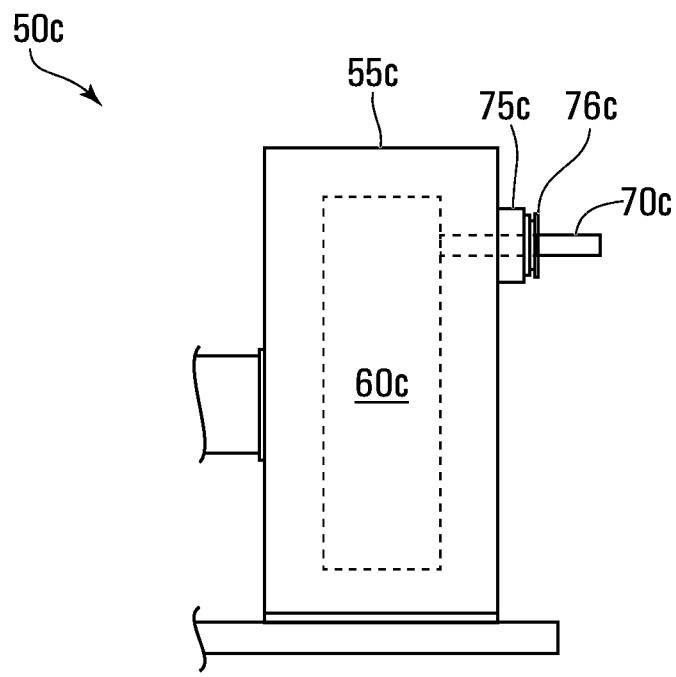
FIG. 8B is a side view representation of the apparatus shown in FIG. 8A with the extendible arm in a retracted position.

Referring to FIGS. 8A and 8B, another example of an apparatus 50*c* to connect a power distribution network with a mobile utility-scale energy storage unit is generally shown. Like components of the apparatus 50*c* bear like reference to their counterparts in the apparatus 50, except followed by the suffix "c". It is to be appreciated by a person of skill with the benefit of this description that apparatus 50*c* is not limited and may include additional components, such as those discussed above in connection with the apparatus 50. In the present example, the mobile utility-scale energy storage unit may be on a trailer that is positioned proximate to the apparatus 50*c* for connecting to the power distribution network. Accordingly, the apparatus 50*c* may also include additional sensors and controls to automate the docking, positioning, or connection process between the mobile utility-scale energy storage unit and the power distribution network. In the present example, the apparatus includes an enclosure 55*c*, an interface device 60*c*, a cable 70*c*, and an extendible arm 75*c* with a connector 76*c*.

The extendible arm 75*c* is connected to the enclosure 55*c* and is to extend from the enclosure 55*c* to reach the mobile utility-scale energy storage unit. The extendible arm 75*c* includes a connector 76*c* disposed at the opposite end away from the enclosure 55*c*. The connector 76*c* is to mate with a complimentary connector on the wall of the mobile utility-scale energy storage unit. Accordingly, when the extendible arm 75*c* is engaged with the mobile utility-scale energy storage unit, a weatherproof seal is formed between the enclosure 55*c* and the mobile utility-scale energy storage unit.

In the present example, the extendible arm 75*c* may be in an extended position as shown in FIG. 8A to mate the connector 76*c* with the complimentary connector on the wall of the mobile utility-scale energy storage unit. When the apparatus 50*c* is not in use, the extendible arm 75*c* may also be retracted as shown in FIG. 8B for storage. In the present example, the extendible arm 75*c* is substantially hollow to provide substantial space for the cable 70*c* to pass therethrough. The connector 76*c* is not limited and may connect to the wall of the mobile utility-scale energy storage unit using a variety of mechanisms.

In the present example, the extendible arm 75*c* is rigid and provides mechanical strength and structural rigidity to the interconnection between the enclosure 55*a* and the mobile utility-scale energy storage unit as well as to support the cable 70*c*. The manner by which the extendible arm 75*c* is manipulated is not particularly limited. For example, the extendible arm 75*c* may be controlled manually by a user moving the connector 76*c* to the mobile utility-scale energy storage unit. Alternatively, the extendible arm 75*c* may include motors that may be controlled form a nearby panel (not shown). It is to be appreciated by a person of skill with the benefit of this description that since the extendible arm is rigid, additional degrees of freedom of motion may be provided with a rotatable joint or a plurality translational motions along different motion axes.

Various advantages will now become apparent to a person of skill with the benefit of this description. In particular, the apparatus 50, 50*a*, 50*b*, or 50*c* may be used to provide a standardized interconnection interface for all a mobile utility-scale energy storage unit. The mobile utility-scale energy storage unit is not limited and the apparatus 50, 50*a*, 50*b*, or 50*c* may be configured to connect with different models of the mobile utility-scale energy storage unit with different capacities and power ratings. In the examples above, the mobile utility-scale energy storage unit is to be backed into a parking space to be connected to a power distribution network, such as a utility grid through the unique electrical and communications docking arm and platform lock. A transformer may be also included to adjust the voltage provided to the power distribution network. Furthermore, it is to be appreciated by a person of skill in the art that the features of the apparatus 50, 50*a*, 50*b*, or 50*c* may be modified or combined with features of other 50, 50*a*, 50*b*, or 50*c*. For example, the apparatus 50 may include the transformer 80*a* without an extendible arm.

It should be recognized that features and aspects of the various examples provided above may be combined into further examples that also fall within the scope of the present disclosure.

What is claimed is:

1. An apparatus comprising:
    an enclosure to protect an interior space from weather elements;
    an interface device disposed within the enclosure, the interface device connected to a power distribution network;
    a bellows extending from the enclosure, wherein the bellows is connected to the enclosure at a first end;
    a bellows connector disposed on a second end of the bellows, wherein the second end is opposite the first end, and wherein the bellows connector is to mate with a complimentary connector on a wall of an energy storage unit to form a weatherproof seal; and
    a cable extending from the interface device through the bellows to connect the interface device to the energy storage unit to transfer energy between the power distribution network and the energy storage unit.

2. The apparatus of claim 1, further comprising an extendible arm within the bellows to provide structural rigidity.

3. The apparatus of claim 2, wherein the extendible arm is remotely controlled.

4. The apparatus of claim 1, further comprising a transformer disposed between the interface device and the power distribution network, the transformer to adjust a voltage provided to the power distribution network by the energy storage unit.

5. The apparatus of claim 1, further comprising a concrete slab to support the interface device.

6. The apparatus of claim 1, further comprising a parking guidance system.

7. The apparatus of claim 6, wherein the parking guidance system includes a stop cushion to engage a portion of a transporter carrying the energy storage unit.

8. An apparatus comprising:
    an enclosure to protect an interior space from weather elements;
    an interface device disposed within the enclosure, the interface device connected to a power distribution network;
    an extendible arm extending from the enclosure, wherein the extendible arm is connected to the enclosure at a first end, and wherein the extendible arm is rigid;
    a connector disposed on a second end of the extendible arm, wherein the second end is opposite the first end, and wherein the connector is to mate with an energy storage unit to form a weatherproof seal; and
    a cable extending from the interface device through the extendible arm to connect the interface device to the energy storage unit to transfer energy between the power distribution network and the energy storage unit.

9. The apparatus of claim 8, wherein the extendible arm is remotely controlled.

10. The apparatus of claim 8, further comprising a transformer disposed between the interface device and the power distribution network, the transformer to adjust a voltage provided to the power distribution network by the energy storage unit.

11. The apparatus of claim 8, further comprising a concrete slab to support the interface device.

12. The apparatus of claim 8, further comprising a parking guidance system.

13. The apparatus of claim 12, wherein the parking guidance system includes a stop cushion to engage a portion of a transporter carrying the energy storage unit.

14. A method comprising:
    positioning an energy storage unit to a location proximate to an interface device, wherein the interface device is connected to a power distribution network;
    connecting a cable from the interface device to the energy storage unit to transfer energy between the power distribution network and the energy storage unit; and
    mating a bellows extending from the interface device to an exterior wall of the energy storage unit to form a weatherproof seal between the interface device and the energy storage unit to protect the cable.

15. The method of claim 14, further comprising extending an extendible arm within the bellows to provide structural rigidity.

16. The method of claim 15, wherein extending the extendible arm is remotely controlled.

17. The method of claim 14, further comprising adjusting a voltage provided to the power distribution network by the energy storage unit with a transformer disposed between the interface device and the power distribution network.

18. The method of claim 14, wherein positioning the energy storage unit comprises guiding the energy storage unit with a parking guidance system.

19. The method of claim 18, wherein guiding comprises using a status light.

20. The method of claim 18, wherein guiding comprises engaging a portion of a transporter carrying the energy storage unit with a stop cushion.

* * * * *